(12) United States Patent
Sari et al.

(10) Patent No.: US 6,459,694 B1
(45) Date of Patent: Oct. 1, 2002

(54) METHOD OF INCREASING THE CAPACITY OF A CDMA NETWORK, AND ASSOCIATED UNITS

(75) Inventors: Hikmet Sari, Creteil (FR); Marc Moeneclaey, De Pinte (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/476,361

(22) Filed: Jan. 3, 2000

(30) Foreign Application Priority Data

Nov. 4, 1999 (FR) .............................................. 99 13796

(51) Int. Cl.$^7$ ................................................ H04J 13/00
(52) U.S. Cl. ...................................... 370/342; 370/335
(58) Field of Search ................................ 370/320, 335, 370/342, 441, 479; 375/285

(56) References Cited

U.S. PATENT DOCUMENTS 5,887,034 A * 3/1999 Suzuki ........................ 375/285

FOREIGN PATENT DOCUMENTS

WO  WO 99/09674  2/1999

OTHER PUBLICATIONS

Sari, H. et al.: "Increasing the capacity of CDMA using hybrid spreading sequences and iterative multistage detection" Gateway to 21st century communications village, VTC 1999–Fall, IEEE VTS 50$^{th}$ Vehicular Technology Conference, vol. 2, Sep. 19–22, 1999, pp. 1160–1164, C P000901404, Amsterdam, Netherlands.

* cited by examiner

Primary Examiner—Douglas Olms
Assistant Examiner—Ken Vanderpuye
(74) Attorney, Agent, or Firm—Sughrue Mion, PLLC

(57) ABSTRACT

The invention provides a method of increasing by M, where M is any integer, the number N, where N is any integer greater than or equal to 2, of calls set up between a central unit and remote units of a code division multiple access network, N first group calls plus M second group calls being able to be set up simultaneously in this way and each using an internal spreading code and an external scrambling code. In accordance with the invention, first interference caused by first group calls in each second group call is synthesized and the first synthesized interference caused by first group calls is subtracted from each second group call. Similarly, a first interference caused by second group calls in each first group call is synthesized, and the first synthesized interference caused by second group calls is subtracted from each first group call.

7 Claims, 2 Drawing Sheets

METHOD OF INCREASING THE CAPACITY OF A CDMA NETWORK, AND ASSOCIATED UNITS

The present invention relates generally to a method of increasing the capacity of a CDMA (Code Division Multiple Access) network and to central and/or remote units for implementing the method, the network being a wireless local loop network, for example, or a mobile radio network.

BACKGROUND OF THE INVENTION

To give one example that is not limiting on the invention, the network is one that conforms to the ANSI IS-95 Standard and uses PN codes on the uplink (from the fixed or mobile terminal to the base station) and a combination of Walsh and PN codes on the downlink (from the base station to the fixed or mobile terminal). The network can equally well be one that conforms to the UMTS Standard currently being drawn up by the ETSI, in which case it uses a combination of Walsh and Gold (or Kasami) codes on the uplink (from the fixed or mobile terminal to the base station) and a combination of Walsh and Gold codes on the downlink (from the base station to the fixed or mobile terminal).

The invention applies to any uplink or downlink of a CDMA system which uses, in combination, for each call, a code referred to as an internal spreading code, of the Walsh-Hadamard, etc. type, and a code referred to as an external "scrambling code", of the PN, Gold, Kasami, etc. type. The terms "internal" and "external" are used here to distinguish between two types of code or sequence, for example the Walsh and PN types (see, for example, U.S. Pat. No. 5, 103, 459). The code is referred to as "internal" if the various codes of the set of codes to which it belongs can be used in their entirety within the same cell. Conversely, the code is referred to as "external" if the various codes of the set of codes to which it belongs are not intended a priori to be used within the same cell.

In a CDMA network, a code "chip" $T_c$ constitutes the basic level coding symbol employed and $T_s = N.T_c$ is the duration of a basic symbol of the call, typically one bit (binary digit), N being the ratio between the total spectrum required for N calls and the spectrum required for a single call. N is commonly referred to as the "processing gain" of the CDMA code.

In the CDMA technique used in the context of the invention for the uplink or downlink concerned, on transmission, the symbols of each call are multiplied by two codes from two sets of CDMA codes. For example, these two codes are a sequence referred to as Walsh-Hadamard sequence and a PN sequence, as proposed in U.S. Pat. No. 5, 103, 459, which is hereby incorporated in this application by way of reference. Such sequences are defined by a series of bits having a much higher bit rate than the symbols of the call. This is reflected in the spreading of each call across a much wider band than theoretically required to transmit the symbols of the call in the baseband. On reception, the coding sequence(s) used on transmission are reproduced locally in the receiver in order to separate each call spread on transmission over a band corresponding to N times the band required for each call.

Thus, in simple terms, each CDMA call is defined by the continuous occupation in time ($T_s$) of a band of frequencies equal to N times the frequency band occupied by the call in the baseband. In the prior art, the total number of CDMA calls that can be set up simultaneously is therefore limited by this factor N.

A document issued by the ETSI (European Telecommunication Standard Institute) under the title "ETSI UMTS-L1 98-208" (which is hereby incorporated in this application by way of reference) proposes to use different external PN scrambling codes in the same cell of the mobile radio network in order to increase the capacity of the cell. The above document indicates that the drawback of this solution is that interference in a cell between orthogonal internal codes (in this case Walsh-Hadamard sequences) combined with different PN scrambling codes is greater than the interference between orthogonal codes if only one external scrambling code is used, because the property of orthogonality is lost. The above document therefore proposes to use intelligent or adaptive antennas and to assign the various scrambling codes to respective different portions of the cell, beam forming assuring that there is very little interference between the different codes.

Thus the prior art technique described in the above ETSI document requires intelligent antennas. This prior art solution therefore makes it essential to employ an antenna technology that is extremely difficult to implement. An intelligent antenna, whose coverage beam varies with time, requires particularly high processing intelligence to cover all areas including mobile terminals which can set up a call using a dimension of the beam which is a function of the density of the mobiles and also to prevent beams overlapping each other in order to prevent the problem of interference between codes, as mentioned in the above ETSI document. Furthermore, there is no increase in the capacity of the cell in real terms, but rather the creation of sub-cells within each cell. In reality, the capacity remains the same for each sub-cell.

The document "The cdma2000 ITU-R RTT—Candidate Submission to US TG8/1—TR45.5's ITU-R RTT candidate submission approved on May 15, 1998" published by the I.T.U (INTERNATIONAL TELECOMMUNICATION UNION), mentions, in particular in Appendix Q, quasi-orthogonal functions for increasing the capacity of the cells of a CDMA network. However, the above document does not propose any solution to the problem of interference between calls, which reduces the technical viability of the proposed solution.

OBJECTS AND SUMMARY OF THE INVENTION

The present invention therefore aims to remedy the aforementioned disadvantages by providing a method of increasing by M the theoretical maximum number N of calls that can be set up on the same CDMA link and providing an effective solution to the problem of interference between calls.

To this end, in a method in accordance with the invention of increasing by M, where M is any integer greater than or equal to one, the number N, where N is any integer greater than or equal to 2, of calls set up between a central unit and remote units of a code division multiple access network, N first group calls plus M second group calls being able to be set up simultaneously in this way and each using an internal spreading code and an external scrambling code:

first interference caused by first group calls in each second group call is synthesized, said first synthesized interference caused by said first group calls is subtracted from each second group call, first interference caused by second group calls in each first group call is synthesized, and said first synthesized interference caused by said second group calls is subtracted from each first group call.

Iteratively, for any value of P greater than or equal to 2:

(1) in a first sub-step, a respective Pth interference that first group calls cause in each second group call is synthesized using decisions on values of symbols of said first group calls taken during a (P−1)th second sub-step, after which said Pth interference is subtracted from the respective first group call, and symbol values of each second group call are decided on after subtracting said Pth interference from each second group call, and (2) in a second sub-step, a respective Pth interference caused by second group calls in each first group call is synthesized using decisions on symbol values of said second group calls taken during the first sub-step (1), after which said Pth interference is subtracted from the respective first group call, and symbol values of each first group call are decided on after subtracting said Pth interference from each first group call.

For example, the N first group calls use respective Walsh-Hadamard orthogonal internal codes and the same external scrambling code of the set of external scrambling codes (PN code, Gold code, Kasami code), and the M second group calls use a sub-set of M orthogonal Walsh-Hadamard internal codes used by the first group calls and another external scrambling code of the set of external scrambling codes (PN code, Gold code, Kasami code) different to that used for the first group.

In another embodiment of the invention, the N first group calls use respective mutually orthogonal internal codes and the same external scrambling code of the set of external scrambling codes (PN code, Gold code, Kasami code) and the M second group calls use respective other mutually orthogonal internal codes which are not orthogonal to the internal codes of the first group calls and an external scrambling code of the set of scrambling codes (PN code, Gold code, Kasami code) identical to the external code used by the first group calls.

The invention also provides a receiver unit of a code division multiple access telecommunication network, N first group calls plus M second group calls being able to be set up simultaneously in this way and each using an internal spreading code and an external scrambling code, the receiver unit comprising:

a first synthesizer for synthesizing a first interference caused by first group calls in each second group call, a subtractor for subtracting said first interference caused by all the first group calls from each second group call, another synthesizer for synthesizing a first interference caused by all second group calls in each first group call, and another subtractor for subtracting said first interference caused by all the second group calls from each first group call.

The unit advantageously comprises, where P is any integer greater than or equal to 2:

for a first sub-step, a Pth synthesizer for synthesizing a respective Pth interference that first group calls cause in each second group call using decisions on values of symbols of said first group calls taken during a (P−1)th second sub-step, a subtractor for subtracting said Pth interference from the respective second group call, and decision means for deciding on symbol values of each second group call after subtracting said Pth interference from each second group call, and for a second sub-step, a Pth synthesizer for synthesizing a respective Pth interference caused by all second group calls in each first group call using decisions on symbol values of said second group calls taken during the first sub-step, a subtractor for subtracting said Pth interference from the respective first group call, and decision means for deciding on symbol values of each first group call after subtracting said Pth interference from each first group call.

BRIEF DESCRIPTION OF THE DRAWINGS

Other features and advantages of the present invention will appear more clearly on reading the following description which is given with reference to the accompanying drawings, in which.

MORE DETAILED DESCRIPTION

Figure 1:
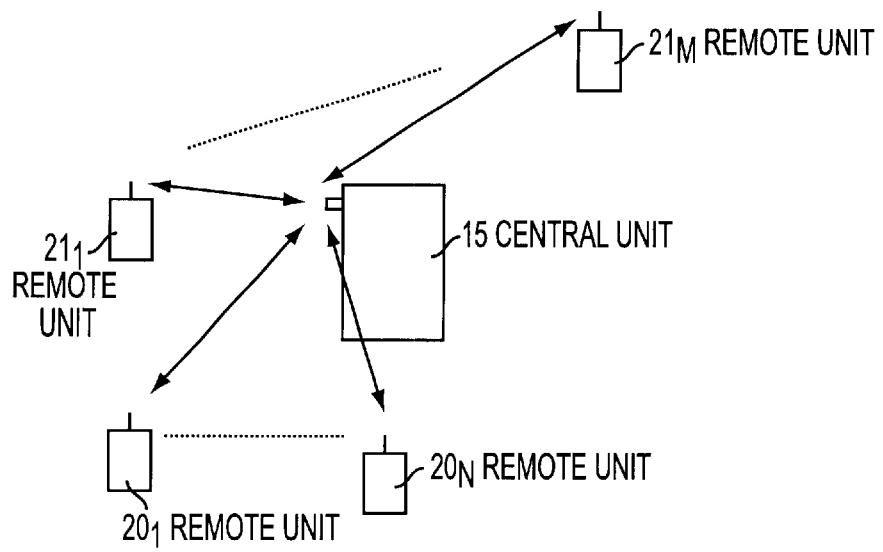
FIG. 1 is a diagrammatic representation of a multiple access network.

Referring to FIG. 1, the present invention applies to a CDMA network. In a network of this kind in accordance with the invention, (N+M) calls are set up between a central unit 15 and (N+M) respective remote units $20_1$–$20_N$ and $21_1$–$21_M$. For example, and this is not limiting on the invention, the units $20_1$–$20_N$ and $21_1$–$21_M$ are fixed terminals or mobile terminals and the central unit 15 is a base station of a mobile radio network. The network can equally well be a cable network or a satellite network. The network is referred to as a "multiple access network" because a plurality of calls between the remote units and the central unit are multiplexed in a given band of the spectrum. In accordance with the invention, N respective calls are set up between the units $20_1$–$20_N$ and the central unit 15 using a CDMA technique. For the M other units $20_1$–$20_M$, where M is any integer greater than or equal to one and can be less than or equal to N for reasons explained below, M respective additional CDMA calls can also be set up. In accordance with the invention, as described hereinafter, the M additional calls do not induce any interference likely to lead to the loss of any of the N calls already set up. Likewise, the N calls already set up do not induce any interference likely to lead to the loss of any of the M additional calls.

In one embodiment, the N calls, referred to as the first group calls, in the cell use respective internal codes, for example Walsh-Hadamard codes, for the various calls of the group and the same PN, Gold or Kasami external scrambling code.

Assuming by way of example that Walsh-Hadamard internal codes and PN external codes are chosen, the M second group calls in the same cell then use a subset of the Walsh-Hadamard internal codes used by the N first group calls and a PN external code different from that used by the first group.

Thus, in this case, interference between the N first group calls and the M additional second group calls are caused by the fact that the two PN sequences selected for the first and second call groups are not mutually orthogonal. The invention provides a solution to the problem of eliminating such interference.

The document "The cdma2000 ITU-R RTT—Candidate Submission to US TG8/1—TR45.5's ITU-R RTT candidate submission approved on May 15, 1998" (which is hereby incorporated in this application by way of reference) published by the I.T.U (INTERNATIONAL TELECOMMUNICATION UNION), mentions quasi-orthogonal functions, in particular in Appendix Q. In another embodiment of the invention, the N first group calls in the cell use respective mutually orthogonal internal codes for the various calls of the group and the same PN, Gold or Kasami external scrambling code.

The M second group calls in the same cell then use respective other mutually orthogonal internal codes for the various second group calls, but not ones that are orthogonal to the internal codes of the first group, and an external scrambling code identical to the external scrambling code used by the first group.

Accordingly, in this case, interference between the N first group calls and the M additional second group calls is caused by the fact that the respective orthogonal internal codes chosen for the first and second groups of calls are not mutually orthogonal.

Figure 2:
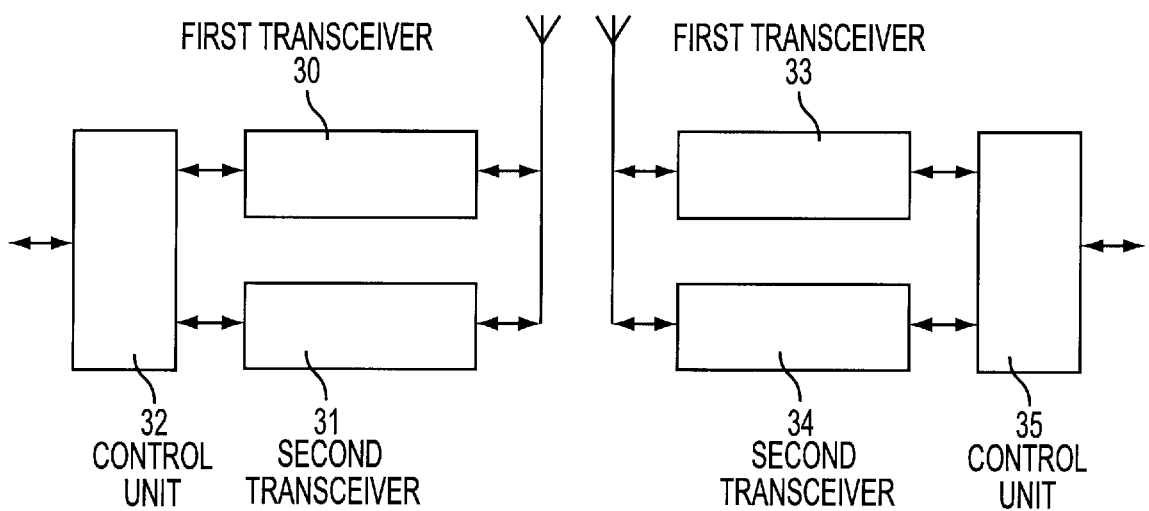
FIG. 2 is a block diagram of a remote unit and a central unit in accordance with the invention communicating with each other.

As shown in FIG. 2, each remote unit $20_1$–$20_N$ and $21_1$–$21_M$ comprises a first transceiver 33 for the first N first group calls and a second transceiver 34 for the M additional second group calls. The functions of a control unit 35 in the remote unit include producing requests for allocation of resources to enable the remote unit to access the telecommunication system. To this end it produces a resource allocation request which is transmitted to the transceiver 33, for example, which transmits it in a particular channel of a bi-directional communication link which is then dedicated to resource request and allocation signaling, as well-known in the art.

The request is received by the control unit 32 in the central unit 15 via the transceiver 30 which, depending on the availability of the N resources allocated to the N first group calls, sends a resource allocation message, the allocated resource using either the resources of the N first group calls or the resources of the M second group calls. The central unit 15 also includes the first transceiver 30 allocated to the N first group calls and a second transceiver 31 allocated to the M second group calls. The control unit 32 includes a resource availability table. The unit 32 uses the table to send a resource allocation message in accordance with the availability of the N resources available for the first group calls and of the M resources available for the second group calls.

In practice, to minimize interference, it is preferable if each new call to be set up is set up between the transceiver 33 and the transceiver 30 as long as a new call can be set up between the transceiver 33 and the transceiver 30. In this case, it is only if all the resources of the transceivers 33 and 30 are busy with calls in progress that a new call to be set up is set up between the transceivers 34 and 31. It is nevertheless entirely feasible for each new call to be set up either between the transceivers 33 and 30 or between the transceivers 34 and 31, independently of any criterion except that of the availability of resources between the transceivers 33 and 30 and the transceivers 34 and 31. In that case, there is significant interference between calls, but this is canceled out in accordance with the invention.

Figure 3:
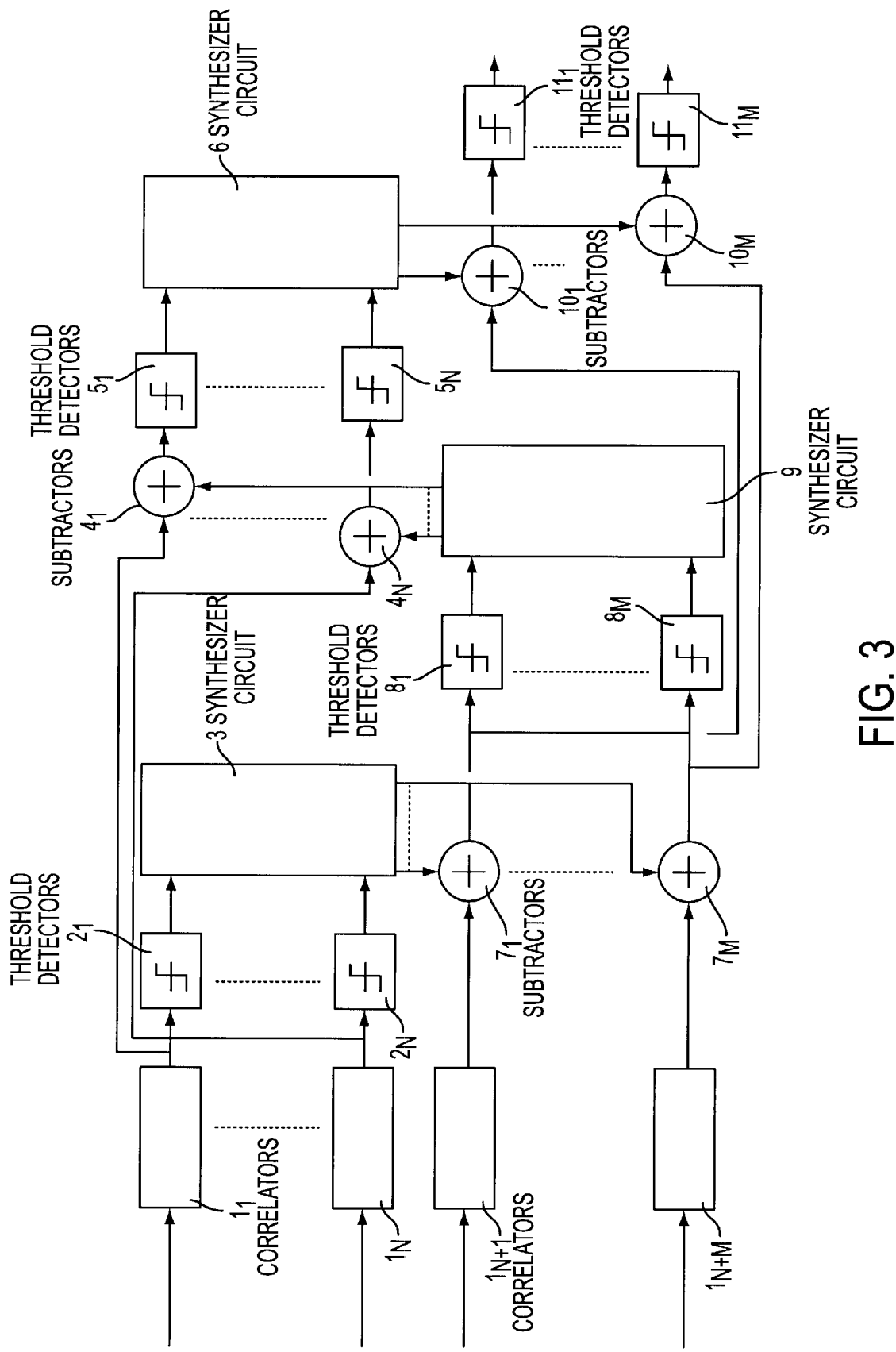
FIG. 3 is a block diagram of a receive circuit of two CDMA communication systems of the invention.

Note that, in the central unit 15, between the first transceiver 30 and the second transceiver 31, and in the remote unit, between the first transceiver 33 and a second transceiver 34, electrical connections as described with reference to FIG. 3 are set up between receivers 30 and 31 and between receivers 33 and 34. The receiving parts of the transceivers 33 and 34 together form a receiver unit. Likewise the receiving parts of the transceivers 30 and 31.

Referring to FIG. 3, although each circuit is represented by separate blocks operating in series, some circuits, for example the interference synthesizer circuits 3 and/or 6 and/or 9, could be combined in a single physical circuit performing the operations executed in the circuits 3 and/or 6 and/or 9. Likewise the subtraction functions performed by the various subtractors and threshold detectors. In this case, it is also feasible for these circuits to operate "in parallel". Similarly, all of these circuits can be implemented totally or partially in software.

The operation of a receiver unit will now be described with reference to FIG. 3.

For the N first group calls, the receiver unit comprises N correlators $1_1$–$1_N$, N first threshold detectors $2_1$–$2_N$, a first interference synthesizer circuit 3, N subtractors $4_1$–$4_N$, N second threshold detectors $5_1$–$5_N$ and a second interference synthesizer circuit 6.

For the M second group calls, it includes M correlators $1_{N+1}$–$1_{N+M}$, M first subtractors $7_1$–$7_M$, M first threshold detectors $8_1$–$8_M$, an interference synthesizer circuit 9, M second subtractors $10_1$–$10_M$, and M second threshold detectors $11_1$–$11_M$. The term "correlator" designating each of the units $1_1$–$1_N$ and $1_{N+1}$–$1_{N+M}$ is used in this description not only to designate a circuit having the correlation function proper (i.e. a circuit detecting coincidence between a received signal and a local CDMA code sequence by detecting a peak), but also ancillary circuits for demodulating the received CDMA call signal accordingly (e.g. circuits for recovering multi-pass signals and demodulating the received signal as a function of the local CDMA code sequence detected as appropriate).

Such circuits for the CDMA technology are well-known in the art. In particular, the skilled person knows how to modulate a data signal to be transmitted in CDMA mode, for example by QPSK modulation, and multiplied by a Walsh-Hadamard internal sequence, followed by multiplication of the resulting sequence by a PN, Gold, etc. external scrambling code. Similarly, the skilled person is aware that the correlators$_1$–$1_N$ and $1_{N+1}$–$1_{N+M}$ are well-known in the art (see, for example, U.S. Pat. No. 5,103,459). Each correlator includes a circuit for locally generating internal and external transmission codes, a correlator for detecting correlation peaks between the received signal and the locally generated sequences to synchronize the phase of the locally generated sequences to the phase of the sequences conveyed by the received signal, and a demodulator, for example a QPSK demodulator.

Each of the N correlators $1_1$–$1_N$ CDMA demodulates the respective call received to produce a demodulated baseband call signal which is applied to a respective first threshold detector $2_1$–$2_N$. Each threshold detector $2_1$ to $2_N$ is in reality a circuit which receives the demodulated baseband call signal and produces symbols from a limited set of authorized symbols, the symbols produced being the symbols retained by the threshold detector $2_1$ to $2_N$ as having the highest probability of being the symbols actually transmitted by the remote transmitter. Each series of symbols produced by a respective one of the threshold detectors $2_1$ to $2_N$ is applied to a respective input of the first interference synthesizer circuit 3. This circuit uses an algorithm to evaluate the interference caused by the set of N first group signals on each second group signal. The algorithm used in the interference synthesizer circuit is as follows, for example:

$a_k$ (k=1, 2, . . . , N) designates N symbols respectively transmitted by N remote units $20_1$ to $20_N$ in CDMA mode at the same given time and $a_k$ (k=N+1, N+2, . . . , N+M) designates M symbols respectively transmitted by N remote units $20_1$ to $20_M$ in CDMA mode at the same given time. Each of the N first group calls is allocated a respective one of N Walsh-Hadamard (WH) sequences of length N and $W_k=(W_{k,1}, W_{k,2}, \ldots, W_{k,N})$ designates the kth WH sequence allocated to the kth call of the N first group calls.

To have more than N users in the same cell, some of the N WH sequences are reassigned but with another PN external scrambling sequence. If the number of users is K=N+M, the first N users use a PN sequence as follows:

$P1=(P_{1,1}, P_{1,2}, \ldots, P_{1,N})$ and the next M users use a sequence:

$P2=(P_{2,1}, P_{2,2}, \ldots, P_{2,N})$

All spreading and scrambling operations amount to multiplying the bit to be transmitted by a sequence formed of the term by term product of the WH and PN sequences allocated to the call. For users 1 to N, the composite sequence is:

$$U_k = P1 \cdot W_k = (P_{1,1}\ W_{k,1}, P_{1,2}\ W_{k,2}, \ldots, P_{1,N}\ W_{k,N})$$

and for the next M users, denoted N+1 to N+M, the composite sequence is of the form:

$$V_k = P2 \cdot W_k = (P_{2,1}\ W_{k,1}, P_{2,2}\ W_{k,2}, \ldots, P_{2,N}\ W_{k,N}).$$

With the above notation, the kth user transmits a signal $a_k U_k$ when $k \leq N$ and $a_k V_k$ when k>N, where $a_k$ is the bit to be sent by that user. This is a symbolic form of notation in which time does not figure, but it is clear that the N components of the sequences indicated above are transmitted at the chip rate, which is N times greater than the bit rate.

This defines two groups of users: N first users and M second users. There is no interference within the same group, because two users from the same group use different WH sequences and the PN sequence is the same. However, users from different groups suffer mutual interference at a level of 1/N times the power of the wanted signal.

As a result of the foregoing, on detection, for the first group of users, the output of the correlator $1_k$ ($k_{32}$ 1, 2, . . . , N) is written:

$$y_k = Na_k + \sum_{m=1}^{M} a_{N+m} U_k^T V_m, k = 1, 2, \ldots, N \quad (1)$$

(where the exponent T designates the transposed vector). The outputs of the N correlators $1_k$ ($k_{32}$ 1, 2, . . . , N) are respectively applied to the threshold detectors $2_k$, k 1, 2, . . . , N , which take respective preliminary decisions $\hat{a}_1, \hat{a}_2, \ldots, \hat{a}_N$.

The output of a correlator $1_{N+m}$, m=1, 2, . . . , M for the second group of users is written:

$$y_{N+m} = Na_{N+m} + \sum_{k=1}^{N} a_k U_k^T V_m, m = 1, 2, \ldots, M. \quad (2)$$

The sequences $U_k$ and $V_m$ are known and estimated values $\hat{a}_k$ of the symbols $a_k$ (for k from 1 through N) are available at the output of the correlators $1_1-1_N$, so there is therefore an estimated value of the interference affecting each call of the second group. This interference, which is calculated in the circuit 3, is written:

$$\hat{I}_{N+m} = \sum_{k=1}^{N} \hat{a}_k U_k^T V_m, (m = 1, \ldots, M) \quad (3)$$

This term (3) is subtracted by a subtractor $7_m$ (m=1, . . . , M) from the signal from the respective correlator $1_{N+m}$ (m=1, . . . , M), and the resulting signal is sent to a threshold detector $8_m$ (m=1, . . . , M) for a preliminary decision $\hat{a}_{N+m}$, (m=1, . . . , M) to be taken. Note that if all the decisions of the first step are correct, i.e. $\hat{a}_k=a_k$ for k=1, 2, . . . , N, the interference would be totally canceled for the second group of users.

The decisions $\hat{a}_{N+1}, \hat{a}_{N+2}, \ldots, \hat{a}_{N+M}$ taken in the step described above are used in turn to estimate the interference affecting the first group of N users. The interference, calculated in the circuit 9, is written:

$$\hat{I}_k = \sum_{m=1}^{M} \hat{a}_{N+m} U_k^T V_m \quad (4)$$

for the kth user. The interference (4) estimated in the circuit 9 is subtracted ($4_1-4_N$) from the output of the respective correlator $1_1-1_N$ and the resulting signal is applied to a threshold detector $51-5N$ so that more reliable decisions can be taken for the first group of users. The N decisions taken are designated $\tilde{a}_1, \tilde{a}_2, \ldots, \tilde{a}_N$.

At this stage there is a better estimate of the interference affecting the second group of users. This interference, calculated by the circuit 6, is given by the equation:

$$\hat{I}_{N+m} = \sum_{k=1}^{N} \tilde{a}_k U_k^T V_m, m = 1, \ldots, M \quad (5)$$

The decisions taken by the threshold detectors $11_1-11_M$ are taken after subtraction $10_1-10_M$ of this latter estimate of the interference from the signals from the subtractors $7_1-7_M$ of the correlator. These decisions are denoted $\tilde{a}_{N+1}, \tilde{a}_{N+2}, \ldots, \tilde{a}_{N+M}$.

To obtain a call signal of a given mode having a lower interference level, P iterations of the interference synthesis described above can be carried out, in accordance with the invention, as will become apparent hereinafter.

The unit shown in FIG. 3 therefore operates in the following manner: each of the M subtractors $7_1-7_M$ subtracts the interference synthesized by the circuit 3 from a respective one of the M second group call signals. The outputs of the M subtractors $7_1-7_M$ are applied to respective inputs of the M threshold detectors $8_1-8_M$, each of which produces a series of symbols of a call of the second group in which the interference from the first group calls is significantly attenuated.

The respective outputs of the M threshold detectors $8_1-8_M$ are applied to inputs of the interference synthesizer circuit 9, which produces at each of its N respective outputs an interference signal to be deducted from a respective one of the N call signals of the first group, by one of the N subtractors $4_1-4_N$. The outputs of the N subtractors $4_1-4_N$ are applied to respective inputs of the threshold detectors $5_1-5_N$. Each threshold detector produces a series of symbols of one of the N first group calls in which the interference from the M second group calls is significantly attenuated.

As a result of the foregoing processing, series of first group and second group call symbols for which the interference level is significantly attenuated are obtained at the outputs of the threshold detectors $5_1$–$5_N$, and $8_1$–$8_M$.

The processing described above can be reiterated for at least one of the groups of calls. This is effected in the FIG. 3 circuit by the interference synthesizer circuit 6, the subtractors $10_1$–$10_M$ and the threshold detectors $11_1$–$1_M$. The interference synthesizer circuit 6 receives the respective outputs of the N threshold detectors $5_1$–$5_N$ The circuit 6 uses an algorithm to evaluate the interference generated by all first group calls on each call of the second group, after the first interference subtraction. Each of the M subtractors $10_1$–$10_M$ subtracts the interference synthesized by the circuit 6 from a respective one of the M first group call signals, in which a first interference subtraction process has already been carried out. The outputs of the M subtractors $10_1$–$10_M$ are applied to respective inputs of the M threshold detectors $11_1$–$1$ $1_M$ each of which produces a series of symbols of a first group in call which the interference from second group calls is further significantly attenuated.

The following steps are therefore implemented:

A first interference caused by all first group calls in each second group call is synthesized. This first synthesized interference is then subtracted from the second group call. A first interference caused by all second group calls in each first group call is then synthesized. This interference is then subtracted from each first group call.

To improve the quality of the received call, iteratively, for any value of P greater than or equal to 2:

(1) in a first sub-step, a respective 2nd interference that all first group calls cause in each second group call is synthesized (6) using decisions on values of symbols of said first group calls taken during a (P–1)th second sub-step, after which said 2nd interference is subtracted ($10_1$–$10_N$) from the respective first group call, and symbol values of each second group call are decided ($11_1$–$11_M$) on after subtracting ($10_1$–$10_N$) said 2nd interference from each second group call, and (2) in a second sub-step, a respective 2nd interference caused by all second group calls in each first group call is synthesized (the synthesizer is not shown and has to be downstream of the threshold detectors ($11_1$–$11_N$)) using decisions ($11_1$–$11_N$) on symbol values of said second group calls taken during the first sub-step (1), after which said 2nd interference is subtracted from the respective first group call, and symbol values of each first group call are decided on after subtracting said 2nd interference from each first group call; and so on for interference for any value of P.

Thus for any value of P greater than 2:

(1) in a first sub-step, a respective Pth interference that all first group calls cause in each second group call is synthesized using decisions on values of symbols of said first group calls taken during a (P–1)th second sub-step, after which said Pth interference is subtracted from the respective first group call, and symbol values of each second group call are decided on after subtracting said Pth interference from each second group call, and (2) in a second sub-step, a respective Pth interference caused by second group calls in each first group call is synthesized using decisions on symbol values of said second group calls taken during the first sub-step (1), after which said Pth interference is subtracted from the respective first group call, and symbol values of each first group call are decided on after subtracting said Pth interference from each first group call.

In synthesizing the interference, the invention takes account only of decisions taken by threshold detectors deemed to be reliable. Consider, for example, the first iteration intended to cancel interference from the N first group calls to the M second group calls. The interference is synthesized by the circuit 3 using the decisions (â$_1$, â$_2$, . . . , â$_N$) taken by the threshold detectors $2_1$–$2_N$. According to the invention, if the input signals $a_k$ (k=1, 2, . . . , N) of the threshold detectors corresponding to these decisions (â$_1$, â$_2$, . . . ,â$_N$) are below a predetermined threshold, the decisions corresponding to the inputs are not reliable and the corresponding interference, normally calculated by the circuit 3, is not subtracted from the M second group signals. In this case, the interference generated by SOME calls of the given group on each call of the other group is synthesized instead of the interference generated by ALL the calls of a given group on each call of another group.

This improves the operation of the unit shown in FIG. 3.

What is claimed is:

1. A method of reducing interference between calls set up between a central unit and remote units of a code division multiple access network, such that N first group calls plus M second group calls can be set up simultaneously with each call using an internal spreading code and an external scrambling code, wherein said method comprises the steps of:

synthesizing first interference caused by first group calls in each second group call, subtracting said first synthesized interference from each second group call, synthesizing first interference caused by second group calls in each first group call, and subtracting said first synthesized interference from each first group call.

2. A method according to claim 1, wherein, iteratively, for any value of P greater than or equal to 2:

(1) in a first sub-step, a respective Pth interference that first group calls cause in each second group call is synthesized using decisions on values of symbols of said first group calls taken during a (P–1)th second sub-step, after which said Pth interference is subtracted from the respective first group call, and symbol values of each second group call are decided on after subtracting said Pth interference from each second group call, and (2) in a second sub-step, a respective Pth interference caused by second group calls in each first group call is synthesized using decisions on symbol values of said second group calls taken during the first sub-step, after which said Pth interference is subtracted from the respective first group call and symbol values of each first group call are decided on after subtracting said Pth interference from each first group call.

3. A method according to claim 1, wherein the N first group calls use respective Walsh-Hadamard orthogonal internal codes and the same external scrambling code of a set of external scrambling codes, and wherein the M second group calls use a sub-set of M orthogonal Walsh-Hadamard internal codes used by the first group calls and another external scrambling code of the set of external scrambling codes different from the external scrambling code used for the first group.

4. A method according to claim 1, wherein the N first group calls use respective mutually orthogonal internal codes and the same external scrambling code of a set of external scrambling codes and wherein the M second group calls use respective other mutually orthogonal internal codes which are not orthogonal to the internal codes of the first group calls and an external scrambling code of the set of scrambling codes identical to the external code used by the first group calls.

5. A receiver unit of a code division multiple access telecommunication network, N first group calls plus M second group calls being able to be set up simultaneously in this way each using an internal spreading code and an external scrambling code, the receiver unit comprising a first synthesizer for synthesizing a first interference caused by first group calls in each second group call, a subtractor for subtracting said first interference caused by all the first group calls from each second group call, another synthesizer for synthesizing a first interference caused by second group calls in each first group call, and another subtractor for subtracting said first interference caused by all the second group calls from each first group call.

6. A unit according to claim 5, comprising, where P is any integer greater than or equal to 2:

for a first sub-step, a Pth synthesizer for synthesizing a respective Pth interference that first group calls cause in each second group call using decisions on values of symbols of said first group calls taken during a (P−1)th second sub-step, a subtractor for subtracting said Pth interference from the respective second group call, and decision means for deciding on symbol values of each second group call after subtracting said Pth interference from each second group call, and for a second sub-step, a Pth synthesizer for synthesizing a respective Pth interference caused by all second group calls in each first group call using decisions on symbol values of said second group calls taken during the first sub-step, a subtractor for subtracting said Pth interference from the respective first group call, and decision means for deciding on symbol values of each first group call after subtracting said Pth interference from each first group call.

7. A mobile radio network base station or terminal comprising a unit according to claim 5.

* * * * *